US012165188B2

(12) United States Patent
Tuchler et al.

(10) Patent No.: US 12,165,188 B2
(45) Date of Patent: Dec. 10, 2024

(54) SYSTEMS AND METHODS FOR CREATION OF PERSONALIZED ARTWORK INCLUDING WORDS CLOUDS

(71) Applicant: GIFTS FOR YOU, LLC, Woodridge, IL (US)

(72) Inventors: James Tuchler, Woodridge, IL (US); Aram Avetissian, Leesburg, VA (US)

(73) Assignee: GIFTS FOR YOU, LLC, Woodridge, IL (US)

( * ) Notice: Subject to any disclaimer, the term of this patent is extended or adjusted under 35 U.S.C. 154(b) by 342 days.

(21) Appl. No.: 17/532,233

(22) Filed: Nov. 22, 2021

(65) Prior Publication Data

US 2022/0084094 A1    Mar. 17, 2022

Related U.S. Application Data

(63) Continuation-in-part of application No. 16/423,964, filed on May 28, 2019, now Pat. No. 11,182,838, which is a continuation of application No. 15/147,650, filed on May 5, 2016, now Pat. No. 10,304,107.

(Continued)

(51) Int. Cl.
    *G06Q 30/00*     (2023.01)
    *G06Q 30/0601*   (2023.01)
    *G06T 11/60*     (2006.01)

(52) U.S. Cl.
    CPC ..... *G06Q 30/0621* (2013.01); *G06Q 30/0643* (2013.01); *G06T 11/60* (2013.01)

(58) Field of Classification Search
    CPC ..................................... G06Q 30/00
    See application file for complete search history.

(56) References Cited

U.S. PATENT DOCUMENTS

| | | | |
|---|---|---|---|
| 2012/0177303 A1* | 7/2012 | Gananathan | G06T 11/001 382/276 |
| 2013/0007661 A1* | 1/2013 | Klappert | G06Q 30/02 715/811 |

(Continued)

OTHER PUBLICATIONS

Lechat, Filonia, "How to superimpose in word", Techwalla.com, dated Sep. 17, 2016. (Year: 2016).*

(Continued)

*Primary Examiner* — Mark A Fadok
(74) *Attorney, Agent, or Firm* — Mark Malek; Jonathan Staudt Widerman Malek, PL

(57) ABSTRACT

A computer-implemented system and method to create personalized artwork may include an art creation server comprising a processor, a data store, and a controller comprising a plurality of subsystems including a data management engine, a randomization engine, and an online shopping engine. The data management engine may be configured to receive art objects and words. The randomization engine may automatically generate personalized artwork by selectively arranging a subset of the art objects and words. The randomization engine may also be configured to automatically generate a rendering of the personalized artwork, selectively save the rendering of the personalized artwork based upon a save selection by a user, and selectively generate a different rendering of the personalized artwork based upon an edit selection by the user.

21 Claims, 20 Drawing Sheets

Related U.S. Application Data

(60) Provisional application No. 62/157,112, filed on May 5, 2015.

(56) References Cited

U.S. PATENT DOCUMENTS

| | | | | |
|---|---|---|---|---|
| 2014/0223462 A1* | 8/2014 | Aimone | ............... | A61B 5/369 725/10 |
| 2016/0224940 A1* | 8/2016 | Fulton | ............... | G06Q 10/1053 |
| 2020/0090242 A1* | 3/2020 | Tuchler | ............. | G06Q 30/0643 |

OTHER PUBLICATIONS

Word art 1, Beyondaword, "https:/web.archive. Org/web/20 150228 1 75328/http://www.beyondaword.com.au/personalised-art", dated: Feb. 28, 2015 (Year: 2015).*

Word art 2, Beyondawordz2, https://web.archive.Org/web/20 1503130557 36/nttp:/Avww.beyondaword.com.au:80/prices; dated Mar. 13, 2015. (Year: 2015).*

Word art 3, Beyondaword3; https://web.archive. Org/web/20 150227 145400/nttp:/Avww.beyondaword.com.au/check-out#loginFrm; dated Feb. 27, 2015. (Year: 2015).*

Word art 4, https://web.archive.org/web/20 15031 1163820/http:/ Avwww.beyondaword.com.au:80/personalised-artwork; dated Mar. 11, 2015. (Year: 2015).*

Word art 5, Beyondaword, https://web.archive.Org/web/20 150424075450/nttp:/Avww.beyondaword.com.au/; dated Apr. 24, 2015. ( Year: 2015).*

Word art 6, Beyondaword, https://web.archive.Org/web/20 15031305522 1 /http:/Avww.beyondaword.com.au:80/faq, dated Mar. 13, 2015. (Year: 2015).*

Word art 7, Worditout.com, https:/web.archive.org/web/20 150423 14301 7/htto://worditout.com/, dated Apr. 23, 2015. (Year: 2015).*

Word art 8, Posterhaste, httos:/web.archive.org/web/20141221103142/ https:/Avww.posterhaste.com/, dated Dec. 21, 2014 (Year: 2014).*

Word art 9, Your Perfect Canvas, https://web.archive.org/web/ 20150502190839/http://www.yourperfectcanvas.com/faq.php , dated May 2, 2015 (Year: 2015).*

Word art 10, Your Perfect Canvas, https://web.archive.org/web/ 20150430070120/http://www.yourperfectcanvas.com/wordcloud. php, dated Apr. 30, 2015 (Year: 2015).*

Word art 11, Your Perfect Canvas, https://web.archive.org/web/ 20150409001018/http://www.yourperfectcanvas.com:80/create_ word_art_canvas.php, dated Apr. 9, 2015 (Year: 2015).*

Word art 12, https://web.archive.org/web/20150404151110/http:// yourperfectcanvas.com/shopping_cart.php, dated Apr. 4, 2015 (Year: 2015).*

Word art 13, https://web.archive.org/web/20210918190518/https:// wordart.com/tutorials, dated Sep. 18, 2021 (Year: 2021).*

Word art 14, https://web.archive.org/web/20210817140826/https:// wordart.com/, dated Aug. 17, 2021 (Year: 2021).*

Word art 15, https://web.archive.org/web/20211031061913// https:// wordart.com/, dated Oct. 31, 2021 (Year: 2021) (Year: 2021).*

* cited by examiner

500

1200

1300 ⟶

1400

SYSTEMS AND METHODS FOR CREATION OF PERSONALIZED ARTWORK INCLUDING WORDS CLOUDS

RELATED APPLICATIONS

This application is a continuation-in-part application of and claims priority under 35 U.S.C. § 120 of U.S. patent application Ser. No. 16/423,964 filed on May 28, 2019 and titled Systems and Methods for Creation of Personalized Artwork Including Words Clouds, which in turn is a continuation application of and claims priority under 35 U.S.C. § 120 of U.S. patent application Ser. No. 15/147,650, now U.S. Pat. No. 10,304,107, issued May 28, 2019 filed on May 5, 2016 and titled Method and Computer Program Product for Creating Personalized Artwork, which in turn claims priority under 35 U.S.C. § 119(e) of U.S. Provisional Patent Application Ser. No. filed on May 5, 2015 and titled Method and Computer Program Product for Creating Personalized Artwork which, in turn, claims the benefit under 35 U.S.C. § 119(e) of U.S. Provisional Patent Application Ser. No. 62/157,112 filed on May 5, 2015 and titled Word-Art Randomization Engine (WARE. The contents of these applications are incorporated herein by reference.

FIELD OF THE INVENTION

The present invention relates to the field of graphic artwork and, more specifically, to methods and a computer program product for creating personalized artwork based on consumer-specific design constructs.

BACKGROUND OF THE INVENTION

Gift selection can be a daunting task because of the essentially personal nature of the activity. Gift givers are often intimidated by the prospect of selecting a gift that is not pleasing to the recipient. Even for those givers who are able to discern how a particular gift will be perceived by the recipient, the challenge of selecting, procuring, and delivering such a gift may be time consuming, expensive, and/or stressful.

The advent of online shopping and auctions has, to a certain degree, simplified the tasks of procuring and delivering gift items. However, the sheer volume of goods and services that may be searched via the worldwide web may complicate, rather than simplify, the gift selection process. Some attempts have been made to automate decision support for gift selection, but these implementations have been largely directed to "collaborative filtering," defined as making generalized gift recommendations based on collecting taste information from many users and/or prior purchasing patterns. Such gift selection solutions suffer from the shortcomings of not truly "personalizing" the gift selection, of not being based on known likes and dislikes of the recipient, and of not reflecting the nature of the relationship between the giver and recipient.

Alternative to selecting a gift, one approach to personalizing a gift is employment of word art. As used herein, word art (also known as word clouds) may be defined as a collection of words that make up an image. Certain automated implementations known in the art attempt to personalize giftable goods by applying word art to such goods. The word art may include decorative representations of words (such as family names) that have personal meaning to the recipient.

PersonalizationMall.com® offers a "Her Heart of Love Personalized Christmas Cookie Jar," which features a white cookie jar emblazoned with a heart shape made up of word art formed from consumer-specified names. However, the consumer is limited by the web-based system to only eight names. Nor is the consumer offered any selectable word art choices for shape, font, or color choice. Nor is the consumer allowed to specify any symbols.

YouFrameCanvas.com (also referred to as YFCanvas.com) offers a text montage printed to a canvas. However, the consumer is offered no preview of the work art including the consumer-specified words, nor selectable choices for symbol, text orientation, and text color. Nor does the produced canvas feature full wrap at the edges.

The word art builder of Yourperfectcanvas.com empowers a consumer to select shapes, fonts, colors to create a one-off original design. The user may repeat the design process and preview as many times as desired before ordering. However, the user cannot save previews between sessions, and is limited to up to 150 words per design, and the pop-up menus for design parameters is cumbersome to use.

Photographicgifts.com offers a personalized word art print illustrated with an image of a castle atop a hill. Set within the walls of the castle are a collection of consumer-specified words. The consumer is offered a choice of colors. The resultant print may be produced, along with a variety of colored frames and a plastic sheet for protection. However, this implementation offers the consumer no preview, and only rudimentary overlapping options.

Beyondaword.com.au offers personalized canvas art produced to customer selections of system-specified canvas size, shape, background color, multiple type colors, and font style from many choices. However, the custom art object options of the consumer are limited to words and photographs.

Tagxedo.com is a pure word art creator (no emblazoning on various media to produce giftable goods). Therefore, this implementation offers the consumer less extensive customization and pre-set parameters. However, Tagxedo.com does include some application-specific features, such as using a consumer's Facebook® profile to generate a personal word-art image.

What is needed is a product that is not only capable of collecting personal information about an intended recipient of a gift and then automatically creating a personalized work of art as the gift, but also that is rich in design capabilities without sacrificing ease of use. Such a system would be capable of creating the personalized work of art either as a stand-alone good (either digital or physical), or as a work of art produced in combination with a physical gift item. The system should also support both pre-set and user-custom art objects that may be easily layered by a layman user to create production-quality artwork. More specifically, such a system should allow consumer specification of art objects including outline shape (including overlays), design elements (including orientation), and medium setting (including both regular and irregular display surfaces). The system should allow the consumer to quickly and easily preview multiple iterations of a design in progress, and also to save previews between sessions. Such a system should respond to acceptance of a design in progress by automatically processing a purchase transaction, optionally upselling to the consumer, and spawning the production of good, as ordered, that features the design. The system should also be available both to direct consumers and also through third parties by virtue of an application programming interface (API)

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, the present invention advantageously provides a computer-implemented system to create personalized artwork. The system may include an art creation server comprising a processor, a data store, and a controller comprising a plurality of subsystems including a data management engine, a randomization engine, and an online shopping engine. Each of the plurality of subsystems may be configured to manipulate data included in the data store. The data management engine may be configured to receive an art object and a word.

The randomization engine may be configured to automatically generate personalized artwork by selectively arranging a subset of the art object and word. This subset is known as a selected at least one art object and a selected at least one word. The randomization engine may also be configured to automatically generate a rendering of the personalized artwork and display the rendering on a display screen. The randomization engine may further be configured to selectively save the rendering of the personalized artwork based upon a save selection by a user. The randomization engine may still further be configured to selectively generate a different rendering of the personalized artwork based upon an edit selection by the user.

The online shopping engine may be configured to process a purchase order for a good including the personalized artwork. The data store may be configured to store the selected at least one art object, the at least one word, the personalized artwork, and the purchase order. Selective information from the data store may be configured to be output to a production device for making the good to include the rendering of the personalized artwork. The data management engine may further be configured to retrieve from the at least one art object and the at least one word a pre-set outline shape, a pre-set design element, and a pre-set medium setting.

The system may also include an art object server configured to be in data communication with the art creation server. The data management engine may also be configured to retrieve a pre-set outline shape, a pre-set design element, and a pre-set medium setting from the art object server. The art creation server may be configured to be in data communication with a consumer client via a network. The data management engine may be configured to be operated by the consumer client to include in the selected art objects at least one of a custom outline shape, a custom design element, and a custom medium setting. The data management engine may further be configured to be operated by the consumer client to include in the selected art objects at least one design element including at least one of user-specified text as the selected at least one word and user-specified images, defined as dynamic input.

The art creation server may be configured to be in data communication with a consumer client via a network. The online shopping engine may be configured to be operated by the consumer client to purchase the good. The selected art object may further include a medium setting, an outline shape, and/or a design element. The selected art object may alternatively comprise a photo object defined as a selected photo object. The randomization engine may be configured to randomize the selected art object, the selected photo, and the selected word to create the personalized artwork.

The randomization engine may also be configured to offer suggestions to the user of an alternate art object, an alternate photo, and an alternate word to be included to create the personalized artwork based on the selected art object, the selected photo object and the selected word. Selectively arranging the art object and the word may include selectively arranging the art object and the word a horizontal configuration, a vertical configuration, and/or a slanted configuration.

In another embodiment of the present invention, selectively arranging the art object and the word may include selectively arranging the art object and the word in a configuration wherein at least one of the words and the art object can be superimposed on another of the word and the art object.

In still another embodiment of the present invention, selectively arranging the art object and the word may include selecting an art object to be highlighted in the personalized artwork and a word to be highlighted in the personalized artwork. The word that is highlighted may have a boldness that is greater than a boldness of other words on the personalized artwork. Further, the word that is selected to have a greater boldness may be superimposed on the art object that is selected to be highlighted.

In yet another embodiment of the present invention, selectively arranging the art object and the word may include selectively arranging the art object and the word (or words) within a pre-selected shape.

A method aspect of the present invention is for creating personalized artwork, including word clouds. The method may include receiving an art object and a word and automatically generating the personalized artwork with a randomization engine by selectively arranging a subset of the art object and the word to define a selected art object and a selected word. The method may also include automatically generating a rendering of the personalized artwork and displaying the rendering on a display screen. The method may further include selectively saving the rendering of the personalized artwork and selectively generating a different rendering of the personalized artwork. Lastly, the method may include processing a purchase order for goods including the personalized artwork.

DETAILED DESCRIPTION OF THE INVENTION

Figure 1:
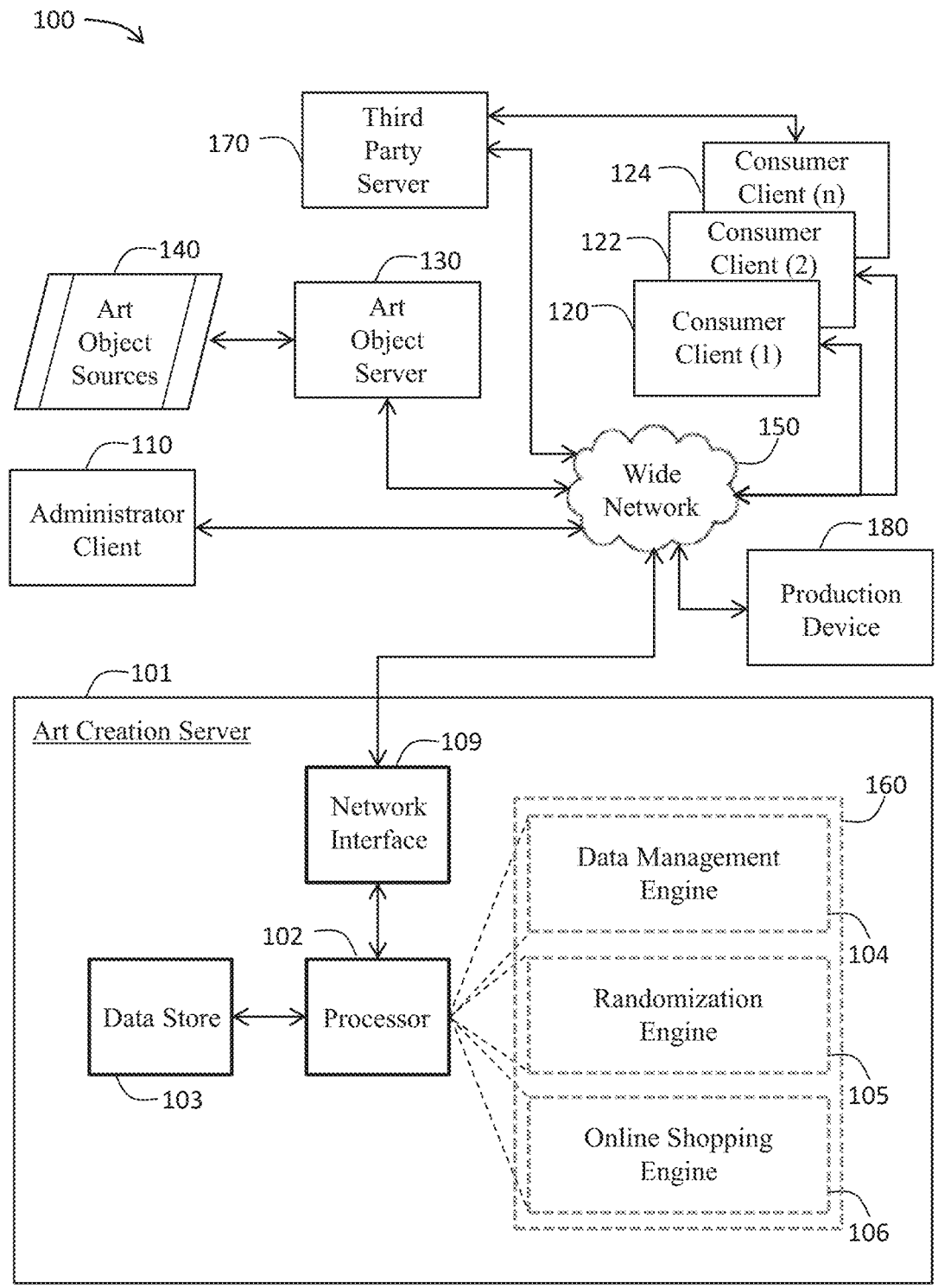
FIG. 1 is a schematic block diagram of a personalized artwork creation system (PACS) according to an embodiment of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a personalized artwork creation system (PACS) according to an embodiment of the present invention is now described in detail. Throughout this disclosure, the present invention may be referred to as an artwork creation system, a personalized artwork system, an artwork design system, a computer-based artwork creation system, a word art system, a word cloud system, a design system, an artwork system, a computer program product, a computer program, a product, a system, a device, and a method. Furthermore, the present invention may be referred to as relating to the implementation of an automated solution for creating personalized artwork. Those skilled in the art will appreciate that this terminology does not affect the scope of the invention. For instance, the present invention may just as easily relate to the implementation of artwork generally, abstract designs, and randomized designs.

Referring to FIGS. 1-15, example methods and systems for a personalized artwork creation system (PACS) are described herein below. In the following description, for purposes of explanation, numerous specific details are set forth to provide a thorough understanding of example embodiments. It will be evident, however, to one of ordinary skill in the art that the present invention may be practiced without these specific details and/or with different combinations of the details than are given here. Thus, specific embodiments are given for the purpose of simplified explanation and not limitation. Some of the illustrative aspects of the present invention may be advantageous in solving the problems herein described and other problems not discussed which are discoverable by a skilled artisan.

Embodiments of the present invention may be employed to design and advantageously create word cloud gifts (personalized artwork pieces) that may be characterized by a theme and that may allow for personalization by adding a recipient's name or meaningful message, and also for customization of parameters applied to art objects (including fonts, shapes and designs) used in the artwork. With hundreds of possible, word and cloud art gifts are truly unique in nature.

Referring now to FIG. 1, the PACS 100 according to an embodiment of the present invention will now be discussed in greater detail. An embodiment of the invention, as shown and described by the various figures and accompanying text, provides an PACS 100 that may implement an automated method of creating consumer-defined and/or personalized artwork. The PACS may generally comprise two logical sub-implementations: a customer-facing front end and a gift-creating production end.

The front end (customer-facing) may assemble multiple layers of art objects in real time and may operate to generate a preview of the personalized artwork that the consumer has defined. The art object layers may include the following: medium (e.g., apparel, canvas); outline shape (e.g., polygon, circle); design elements (e.g., fixed/static images like background or graphic elements, word art imagery such as font and orientation, and overlays that superimpose the word art and/or upon which the word art may be superimposed); and dynamic input from the consumer (e.g., simple text like title or family name, and/or a photograph).

For example, and without limitation, this front end may be managed through a proprietary set of Javascript commands that may optimize imagery in real time to generate two outputs: one low-resolution, work-in-progress image that may be displayed to the consumer, and one high-resolution image that may be used for production purposes.

The production end may use the output of a consumers accepted word art order (essentially production-ready art files) and may either deliver this personalized artwork as is (e.g., digital file) or manage individual layers of the personalized artwork to be used in production of word art goods. For example, and without limitation, good production devices used may include wide-format sublimation and canvas printers, digital printers, and $CO_2$ laser etching machines (note: the latter may use only monochromatic output files).

For example, and without limitation, the front and production ends of the PACS 100, according to an embodiment of the present invention, may be configured to include an Art Creation Server 101, which may be in data communication with an Administrator Client 110, a Consumer client 120, an Art Object Server 130, and a Production Device 180. For example, and without limitation, the Art Object Server 130 may be a third-party content server. The Administrator Client 110, Consumer client 120, Art object server 130, and Production Device 180 each may be coupled to the Art Creation Server 101 using a wide area network 150 such as the Internet. The Art Creation Server 101 also may be in data communication with various third-party Art Object Sources 140 through the Art Object Server 130 and/or through the Internet 150 directly.

In a front end configuration, the Art Creation Server 101 may be configured to receive and process personalized artwork design requests that may originate at some number of Consumer clients 120, 122, 124. For example, and without limitation, the Art Creation Server 101 may be configured to service hundreds of personalized artwork design requests per minute, and may be scalable.

For example, and without limitation, either of the Administrator Client 110 and the Consumer clients 120, 122, 124 may comprise a web browser and a communication application. "Web browser" as used herein includes, but is not limited to, any application software or program (including mobile applications) designed to enable users to access online resources and conduct trusted transactions over a wide network such as the Internet. "Communication" as used herein includes, but is not limited to, electronic mail (email), instant messaging, mobile applications, personal digital assistant (PDA), a pager, a fax, a cellular telephone, a conventional telephone, television, video telephone conferencing display, other types of radio wave transmitter/transponders and other forms of electronic communication. For example, and without limitation, the Administrator Client 110 and the Consumer clients 120, 122, 124 may be configured to execute web applications designed to function on any cross-platform web server running Apache, MySQL, and PHP. Those skilled in the art will recognize that other forms of communication known in the art are within the spirit and scope of the present invention.

A typical user of an Administrator Client 110 may be a contributor to the process of creating and staging art objects for subsequent use by consumers to create their own personalized artwork. For example, and without limitation, PACS 100 users may include subject matter experts in design and creation of digital graphic artifacts. Such a user may interact with various servers included in the PACS 100 through the Administrator Client 110.

Continuing to refer to FIG. 1, the Art Creation Server 101 may comprise a processor 102 that may accept and execute computerized instructions, and also a data store 103 which may store data and instructions used by the processor 102. More specifically, the processor 102 may be configured in data communication with the Administrator Client 110, some number of Consumer clients 120, 122, 124, the Art Object Server 130, and the Production Device 180. Certain Consumer clients 120, 122 may communicate directly with the Art Creation Server 101 using a direct connection and/or network connection 150. Other Consumer clients 124 may communicate indirectly with the Art Creation Server 101 through an intermediary Third Party Server 170 (e.g., the Art Creation Server 101 may serve as an application programming interface to complimentary applications executing on the Third Party Server 170). The processor 102 may be configured to direct input from other components of the PACS 100 to the data store 103 for storage and subsequent retrieval.

For example, and without limitation, the processor 102 may be in data communication with external computing resources 110, 120, 122, 124, 130, 140, 170, 180 through a direct connection and/or through a network connection 150 facilitated by a network interface 109. Data Management Engine 104 instructions, Randomization Engine 105 instructions, and Online Shopping Engine 106 instructions may be stored in the data store 103 and retrieved by the processor 102 for execution. The Data Management Engine 104 instructions, Randomization Engine 105 instructions, and Online Shopping Engine 106 instructions may be collectively referred to herein as a controller 160. Although the data store 103 of FIG. 1 is shown as local storage, a skilled artisan will recognize that the data store 103 may alternatively, or in addition, comprise one or both of server-based storage and cloud storage.

The Data Management Engine 104, according to embodiments of the present invention, may be configured to advantageously manage the creation, selection, and employment of art objects within the system, including electronic file upload and export among the various servers and clients of the system 100.

The Randomization Engine 105, according to embodiments of the present invention, may be configured to advantageously create both work-in-progress and production-ready versions of personalized artwork based on consumer input. More specifically, and referring additionally to FIG. 2, the Randomization Engine 105 may operate to apply the art objects (e.g., dynamic input 141, medium settings 142, outline shapes 143, and design elements 144) as specified by the consumer, while automatically resolving any conflicting constraints among these art objects.

The Online Shopping Engine 106, according to embodiments of the present invention, may be configured to advantageously process trusted transactions regarding the purchase and delivery of ordered goods featuring approved personalized artwork. Successful purchase may also spawn a process to create the ordered good using an available production device 180.

Exemplary operations of the Data Management Engine 104, the Randomization Engine 105, and the Online Shopping Engine 106 are described individually in greater detail below. Those skilled in the art will appreciate, however, that the present invention contemplates the use of computer instructions that may perform any or all of the operations involved in personalized artwork creation, including version control, content searching, customer records administration, and product delivery. The disclosure of computer instructions that include Data Management Engine 104 instructions, Randomization Engine 105 instructions, and Online Shopping Engine 106 instructions is not meant to be limiting in any way. Those skilled in the art will readily appreciate that stored computer instructions may be configured in any way, and independent of choice of platform, while still accomplishing the many goals, features and advantages according to the present invention.

Irrespective of the specifics of stored computer instructions and their implementation, the computer program product 100 may generally include an interface 110, a data store 103, and a controller 160. A person of skill in the art will appreciate that use of the term "data store" within this disclosure is intended to encompass multiple databases and is used generally to refer to a data structure that may store data or information.

The computer program product 100, according to an embodiment of the present invention, may be capable of presenting an interface 110 to a user (sometimes referred to throughout this disclosure as an administrator). The interface 110 may be designed to collect information required to build artwork. For example, and without limitation, the interface 110 may be capable of creating, retrieving, modifying, and storing art objects for subsequent use by consumers.

The interface 110 may allow an administrator to manipulate the information included in the data store 103, which may be accessed using the interface 110. A person of skill in the art will appreciate that additional interfaces 110 may be used to prepare and control how consumers may engage the system 100. For example, and without limitation, the one or more interfaces 110 may be connected remotely over a network to the art creation server 101. The interface 110 may include one or more subset interfaces, through each of which an administrator may manipulate the information included in the data store 103. For example, the interface 110 may include artwork creation interface, an access control interface, a user login interface, and/or any number of additional interfaces through which the computer program product 100 may be interacted. Also, any of the aforementioned subset interfaces may include additional interfaces through which a user may interact with the computer program product 100, according to an embodiment of the present invention. The function of the aforementioned interfaces will be further discussed below.

In addition to interoperation with the interface 110, the data store 103 may communicate with the controller 160, as well as with other components. The data store 103 may include one or more subset databases, which may include information that may be manipulated by a user, such as a process architect. The data store 103 may additionally include digital files, templates, and other data that may be used by the controller 160 to create personalized artwork.

Figure 2:
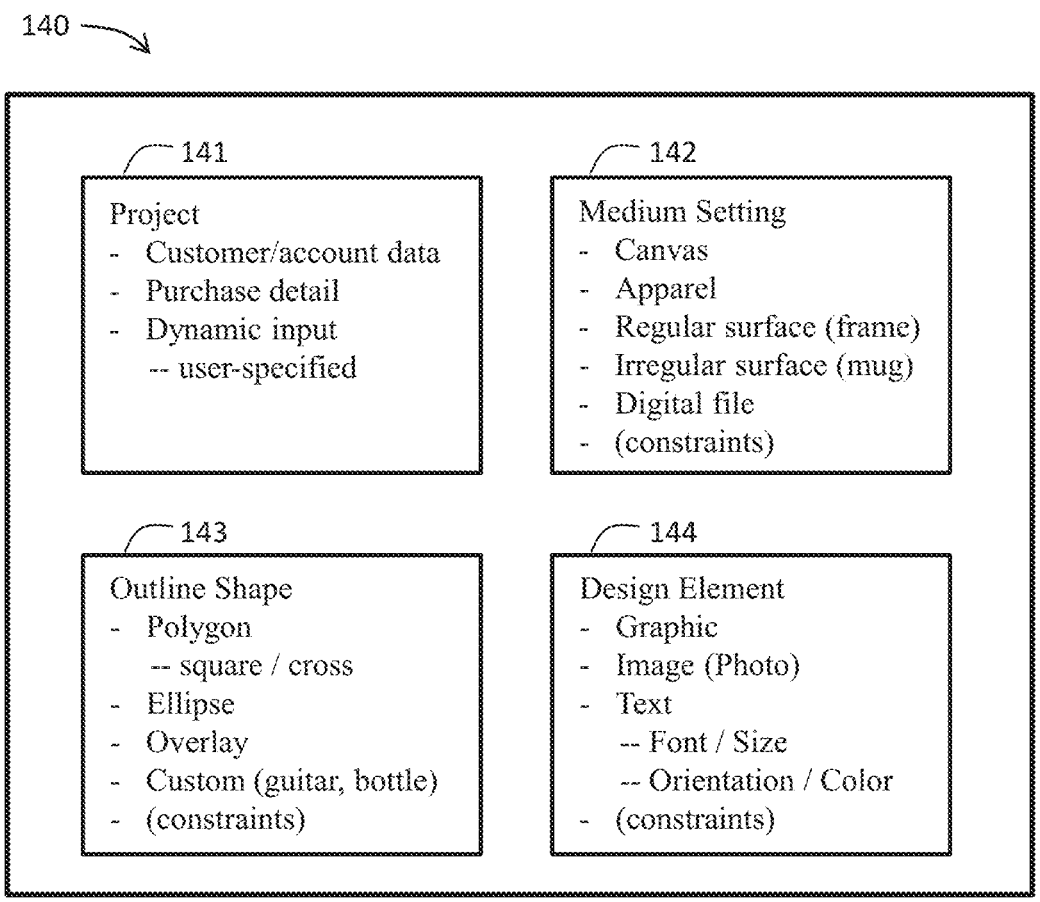
FIG. 2 is a diagram illustrating exemplary data structures of the PACS depicted in FIG. 1.

Continuing to refer to FIG. 1, and referring additionally to FIG. 2, the Art Creation Server 101 may retrieve art objects, and may write to the data store 103 the digital content files representing those objects. For example, and without limitation, the Art object server 130 may process a request from one or more of the controller 160 subsystems 104, 105, 106 of the PACS 100 to download a copy of a particular art object 140. The embodiment of art object sources 140 illustrated in FIG. 2 shows example structures of art objects that may be included in a particular data delivery. Employment of networking may permit the controller 160 subsystems 104, 105, 106 of the PACS 100 to retrieve objects from third-party art object sources 140, thereby enhancing the timeliness and completeness of data used by the system 100. Although the embodiment of the invention discussed herein describes the art object creation, modification, and adornment functionality performed by the subsystems 104, 105, 106 of the PACS 100 as illustrated in FIG. 1, those skilled in the art will readily appreciate that stored computer instructions may be configured in any way while still accomplishing the many goals, features and advantages according to the present invention.

Continuing to refer to FIG. 2, for example, and without limitation, the data structure for a project 141 will now be discussed. A project 141 may be defined as a system identifier for an individual session during which a consumer may engage the system 100 to create a particular piece of personalized artwork. A project 141 may comprise customer and/or account identifying data, purchase detail (e.g., payment confirmation), and dynamic input that the consumer may wish to include in the desired personalized artwork. For example, and without limitation, the dynamic input for a particular project 140 may include text (e.g., a recipient's name) and/or a photograph (e.g., uploaded digital image of the recipient). Such input may be incorporated by the system 100 into design elements 144, and/or derived into multiple.

Continuing to refer to FIG. 2, for example, and without limitation, the data structure for a medium setting 142 will now be discussed. A medium setting 142 may be defined as a type of medium onto which personalized artwork is to be emblazoned. For example, and without limitation, a medium setting 142 may specify the target medium type as being a canvas, an apparel item, a regular surface item (e.g., flat picture frame), an irregular surface item (e.g., curved coffee mug). Also for example, and without limitation, the target medium type may simply be a digital file (e.g., screen saver). Each choice of medium setting may come with its own constraints that may be taken into account by the Randomization Engine 105 (e.g., available print space, medium-specific boundary characteristics, application requirements such as monochromatic output files that may support laser printing).

Continuing to refer to FIG. 2, for example, and without limitation, the data structure for an outline shape 143 will now be discussed. An outline shape 143 may be defined as a dominant shape into which word art is to conform to create the personalized artwork. For example, and without limitation, an outline shape 143 may comprise any polygon or ellipse. Also for example, and without limitation, the outline shape 143 may be customized to conform to any digitally-represented shape (e.g., dog paw print, silhouette portrait). Also for example, and without limitation, the outline shape 143 may comprise an overlay that may superimpose the word art or upon which the word art may be superimposed. Each choice of outline shape 143 may come with its own constraints that may be taken into account by the Randomization Engine 105 (e.g., available print space, shape-specific boundary characteristics, visual acuity factor).

Continuing to refer to FIG. 2, for example, and without limitation, the data structure for a design element 144 will now be discussed. A design element 144 may be defined as a characteristic applied to a dynamic input or other adornment to be included in a personalized artwork. For example, and without limitation, a design element 144 may include some combination of fonts, colors, and orientations for word art. Also for example, and without limitation, a design element may include graphics and/or images that may be used to adorn the word art within the personalized artwork. Each choice of design element 144 may come with its own constraints that may be taken into account by the Randomization Engine 105 (e.g., available print space, visual acuity factor, theme compliance)

Those skilled in the art will appreciate that the present invention contemplates the use of data structures that may store information supporting any or all of the operations involved in delivering personalized artwork to a consumer. The disclosure of the exemplary data structures above is not meant to be limiting in any way. Those skilled in the art will readily appreciate that data structures may include any number of additional or alternative data sources, and may be configured in any way while still accomplishing the many goals, features and advantages according to the present invention.

Figure 3:
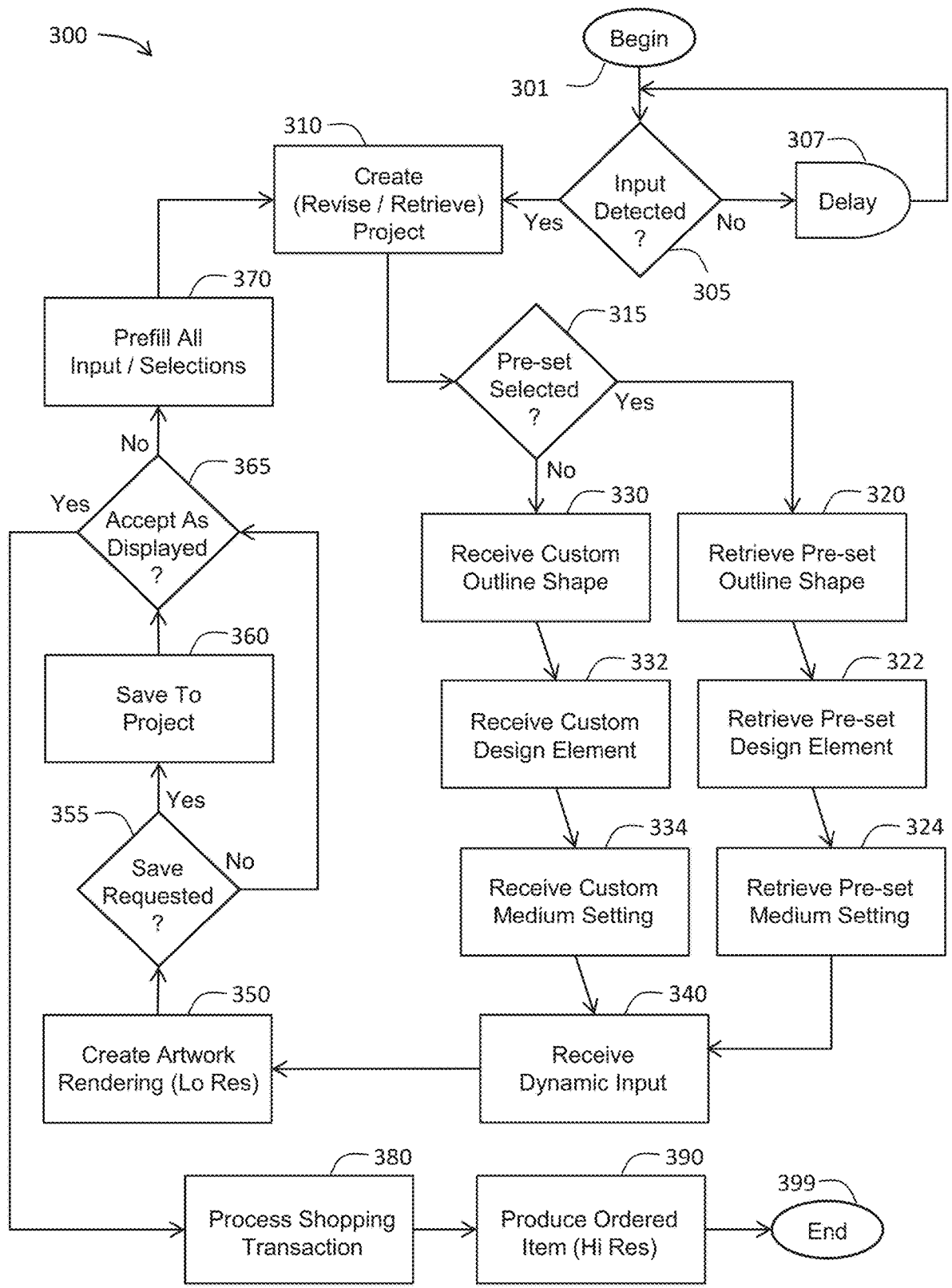
FIG. 3 is a flowchart illustrating the steps performed by a computer program product for creating personalized artwork according to an embodiment of the present invention.

FIG. 3 illustrates, as a method aspect of an embodiment of the present invention, an exemplary process of creating a project site 382 through administrator interaction with the computer program product 100, generally. A person of skill in the art will appreciate the following embodiment is not intended to be limiting, and that alternate programming configurations are included within the scope and spirit of the present invention.

Referring to the flowchart 300 of FIG. 3, an illustrative method aspect of the present invention is now described in greater detail. A person of skill in the art will appreciate that the following method aspect is provided in the interest of clarity, and also will appreciate additional method aspects are within the scope of the present invention included in this disclosure.

Starting at Block 301, a consumer may be authenticated into the system 100 through a user login interface (not shown) that may execute on a consumer client 120. The Data Management Engine 104 may monitor the consumer client 120 for input (Blocks 305 and 307). Depending on the input detected at Block 305, the Data Management Engine 104 may create a new artwork project or retrieve some previously-saved artwork project (Block 310). The consumer then may be allowed, at Block 315, to choose between input of self-directed art objects input by the consumer and employment of pre-set art objects that may be provided by the system 100. For example, and without limitation, a pre-set selection may comprise consumer selection of a word-art item of choice (e.g., pointing and clicking on a gift item to match the consumer's needs, such as a graduation gift).

If the consumer chooses to employ pre-sets, the system 100 may retrieve from the data store 103, for example, and without limitation, an outline shape (Block 320), a design element (Block 322), and/or a Medium Setting (Block 324). Alternatively, if the consumer chooses not to employ pre-sets, the system 100 may prompt the user to input, for example, and without limitation, custom, user-defined art objects including an outline shape (Block 330), a design element (Block 332), and/or a medium setting (Block 334). Whether pre-set or custom, or some combination of the two types, parameters such as color, text orientation, canvas size, and the like may be captured in the above steps.

At Block 340, the consumer may be prompted by the system 100 to enter dynamic input (e.g., enter into requested fields primary title, such as last name of the recipient, along with a selection of meaningful names and symbols to add to the artwork). Using the outline shape (from Block 320 or 330), the design element (from Block 322 or 332), the medium setting (from Block 324 or 334), and the personalized dynamic input of the consumer (form Block 340), the randomization engine 105 may create a low-resolution rendering of the personalized artwork for display to the consumer at the consumer client 120. For example, and without limitation, creation of a first low-resolution rendering may be spawned by the consumer pressing a 'preview' button at the consumer client 120. If the displayed rendering is not to the consumer's liking and/or taste, the consumer may press 'preview' again to cause the Randomization Engine 105 to create a different rendering using the same input values (i.e., art objects). At any time during the process 300, the consumer may be empowered to selectively save personalized artwork to the data store 103 as a "work in progress" (Blocks 355 and 360). Alternatively, or in addition, the system 100 may auto-cache up to three (3) work in progress artworks. A person of skill in the art will recognize the performance gains in involved computing resources both by using low-resolution renderings to support the preview process, and by caching previews for quick and low-cost retrieval.

If, at Block 365, the consumer elects not to accept the personalized artwork as displayed in the form of the low-resolution rendering, the Data Management Engine 104 may prefill the various input fields (e.g., outline shape, design element, medium setting, and dynamic input) as a starting point for the consumer (Block 370) before allowing the consumer to revise the work-in-progress project starting back at Block 310. This looping through process 300, making selective use of pre-set art objects and/or custom, user-directed art objects (Block 315), may continue until the consumer ultimately accepts a version of the personalized artwork that is to the consumer's liking (Block 365).

Acceptance of the personalized artwork by the consumer triggers processing of a shopping transaction (Block 380) by the Online Shopping Engine 106. For example, and without limitation, the Online Shopping Engine 106 may employ e-business constructs such as management of an online shopping cart, upselling based on consumer consumers' custom input and/or pre-set selections, and also calculation of product pricing, taxes, and shipping. Upon successful completion of the purchase transaction, at Block 390 the system 100 may engage a production device 180 to generate the ordered item (e.g., a good featuring a high-resolution rendering of the personalized artwork). For example, and without limitation, the personalized artwork may be printed or etched onto a giftable good. The operation of the computer program product 100 may then terminate at Block 399.

Figure 4:
FIG. 4 is a schematic representation of an exemplary user interface of the computer program product according to an embodiment of the present invention.

Referring now to FIG. 4, a schematic representation 400 is provided, in accordance with an embodiment of the present invention, for a model interface for a consumer to interact with the computer program product 100. Although the following example interface presents a model structure for interaction with the project interface 400 of the computer program product 100, a person of skill in the art will appreciate additional related interfaces to be included in this disclosure, with options and features relative to their respective purposes, that allow the interaction between additional design and configuration interfaces of the computer program product 100 and the consumer. Additionally, a person of skill in the art will appreciate alternate functional and stylistic combinations of various fields and components, in addition to the fields and components discussed in the example below, which would be included within the scope and spirit of the present invention.

Generally speaking, the capability-rich yet easy-to-use interface presented at a consumer client 120, 122, 124 may empower the consumer to accomplish the following toward design and utilization of personalize artwork:

1) Design controls that may be either fixed in a design or exposed to the consumer for selection, such as
    (a) Choose outline shape (heart, star, ribbon, etc.)
    (b) Color palette (individual or groups of colors)
    (c) Font choices (individual or groups of fonts)
    (d) Inclusion of symbols into word-art designs
    (e) Ability to specify size of output file
    (f) Ability to regenerate images until one is found that is preferred.
2) Comingle fixed elements with variable elements
    (a) Some designs may feature fixed elements, like the trunk of a tree in a 'family tree' design, or a wedding ring in a wedding themed design. The word art may flow around these elements, through the use of layers as described above.
    (b) Ability to add a background image or photograph (c) Ability to build designs that include a 'mask' over the word art to create an effect in which the words of the word-art design are cut off artfully (d) Ability to send the artwork to a variety of output devices in compatible formats, including PDF, Corel Draw®, InDesign®, vector artwork and more.

Still referring to FIG. 4, and continuing to refer to FIG. 2, the interface 400 allows for entry of dynamic input 141 (Enter text 430), of outline shape 143 (Shape 420), and multiple design elements 144 (Text type 410, Width 440, Height 450, Fonts Used 460, 490, Text orientation 470, and Use Random Colors option 480).

Figure 5:
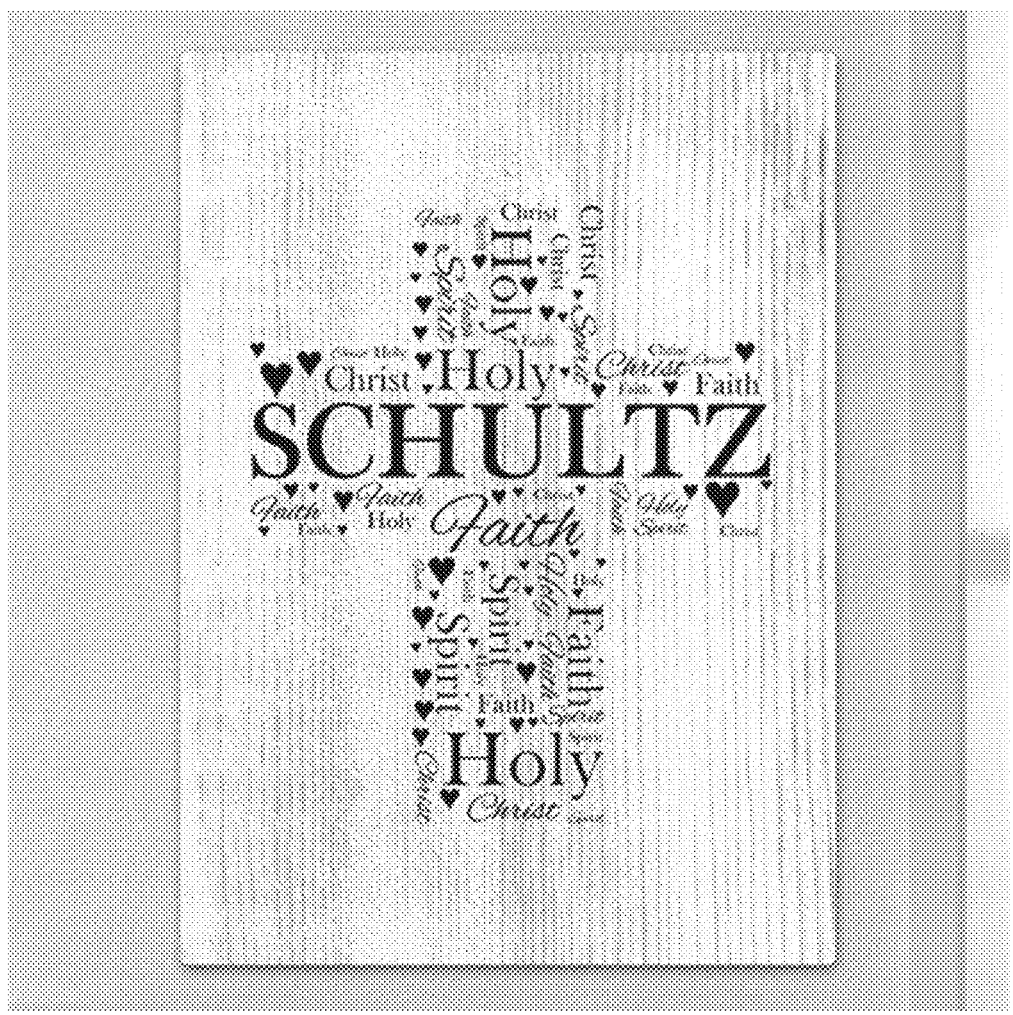
FIG. 5 is a schematic representation of an exemplary personalized artwork as created by the computer program product according to an embodiment of the present invention.

Referring now to FIG. 5, for example and without limitation, after a consumer may supply personalization data, the randomization Engine 105 may generate a randomized design 500 that includes a word-cloud of that consumer's input values as incorporated into a polygonal (e.g., cross) shape on a regular (flat) medium. The entered name (as illustrated, 'Shultz') may be surrounded by repeating and visually-random placed text that may appear in a variety of fonts, sizes, and colors, and also either horizontal or vertical orientation (or both), along with selected symbols (hearts).

Figure 6:
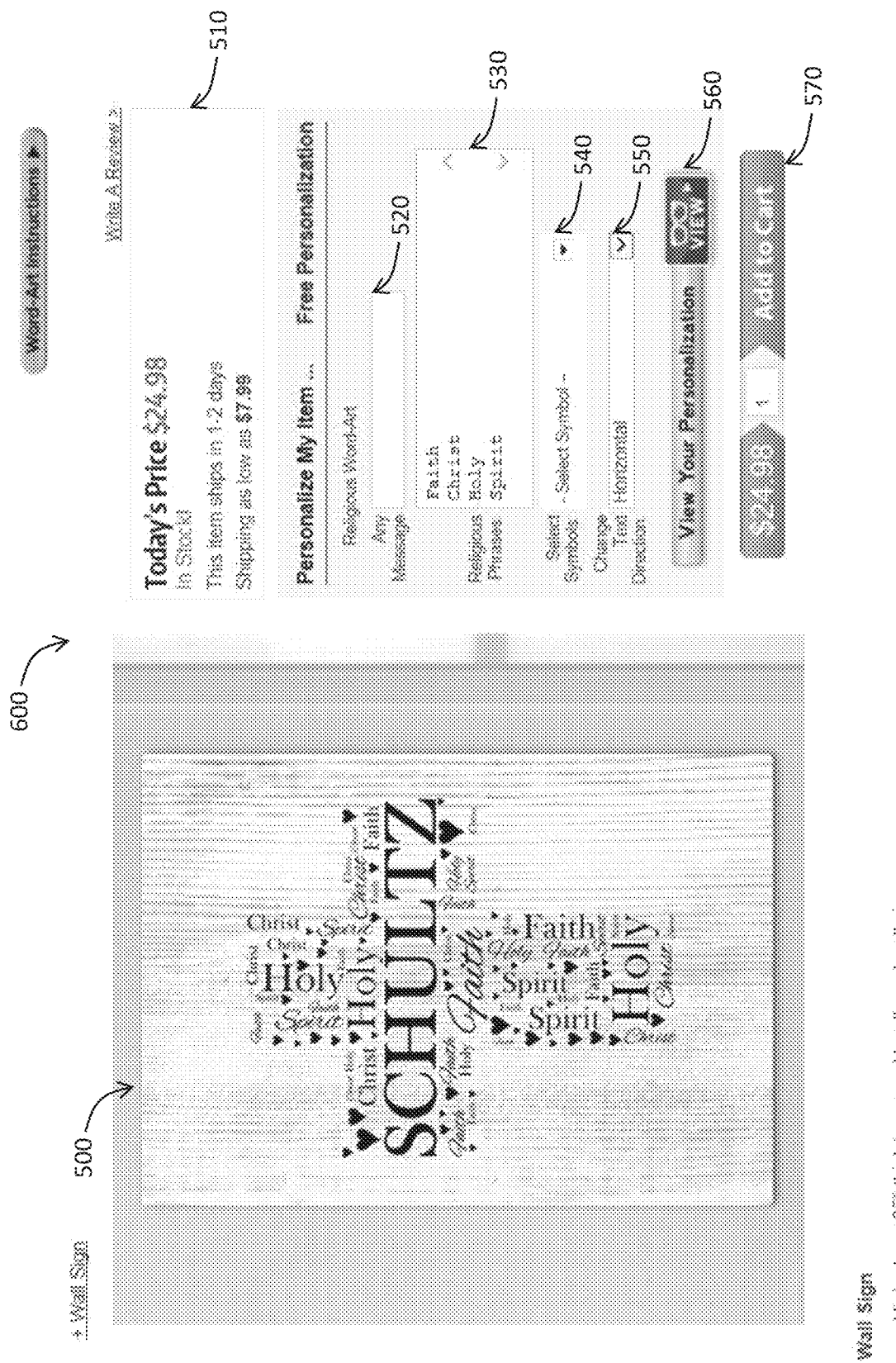
FIG. 6 is a schematic representation of an exemplary user interface of the computer program product as employed to create the exemplary personalized artwork of FIG. 5.

Referring now to FIG. 6, and continuing to refer to FIGS. 2 and 5, the interface 600 allows for entry of dynamic input 141 (Any Message 520, Religious Phrases 530), and multiple design elements 144 (Symbols 540, Text direction 550). The of outline shape 143 of a cross may be a pre-set value for the selected theme. In one embodiment, after the consumer identifies 560 an acceptable work art compilation, the consumer may select the Add To Cart button 570. This action may automatically save the design into the consumer's online shopping cart. To see another rendition of the work art compilation, the consumer may select the View Your Personalization 560 button again to automatically create another version for review. Once the consumer is satisfied with the design, the consumer may select the Add To Cart button 570 to initiate an online purchase trusted transaction.

A person of skill in the art will recognize that the personalized artwork may be applied to a variety of fabricated products including a wide range of gift items such as, for example, and without limitation, apparel (FIG. 14), home décor (FIGS. 7, 9, 10, and 11), seasonal items like ornaments and stockings, barware and kitchenware (FIGS. 12 and 13), jewelry and more.

Figure 7:
FIG. 7 is a schematic representation of an exemplary personalized artwork created by the computer program product according to an embodiment of the present invention.

Referring now to FIG. 7, for example and without limitation, after a consumer may supply personalization data, the randomization Engine 105 may generate a randomized design 700 that includes a word-cloud of that consumer's input values as incorporated into custom (e.g., dog paw print) shape on a regular (flat) medium. The entered name (as illustrated, 'Bella') may be surrounded by repeating and visually-random placed text that may appear in a variety of fonts, sizes, and colors, and also either horizontal or vertical orientation (or both), along with selected symbols (hearts).

Figure 8:
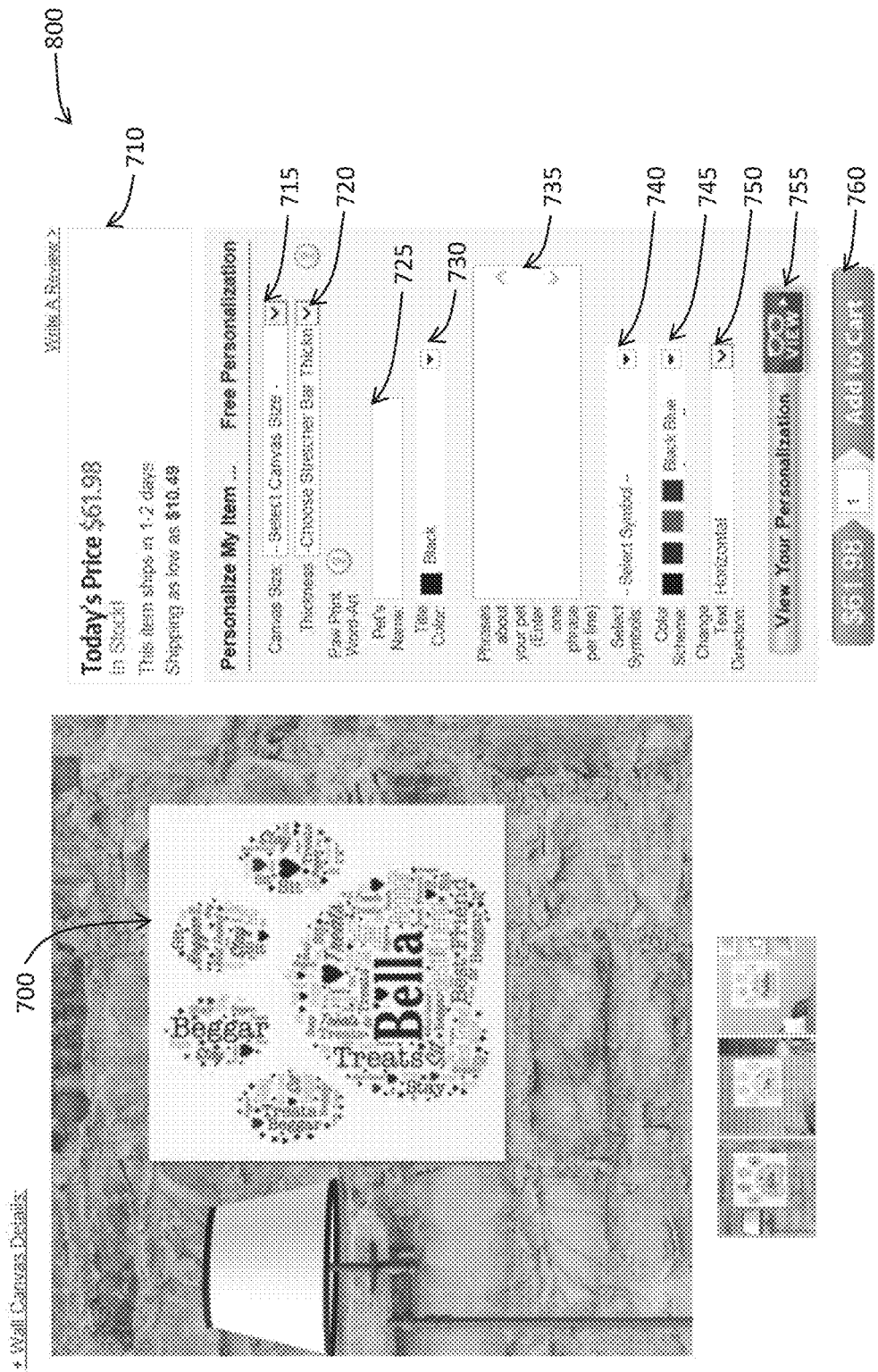
FIG. 8 is a schematic representation of an exemplary user interface of the computer program product as employed to create the exemplary personalized artwork of FIG. 7.

Referring now to FIG. 8, and continuing to refer to FIGS. 2 and 7, the interface 800 allows for entry of dynamic input 141 (Pet's Name 725, Phrases about pet 735), medium settings 142 (Canvas Size 715, Canvas thickness 720), and multiple design elements 144 (Title color 730, Symbols 740, Text direction 750). For example, and without limitation, the system 100 may offer ten (10) color schemes, nine (9) of which the system 100 may pre-select to coordinate with the consumer's pet's name presented in dark brown. Alternatively, the consumer may select the Custom option which will allow the consumer to select up to five (5) colors and to create one's own color scheme.

The outline shape 143 of a dog paw may be a pre-set value for the selected theme. In one embodiment, after the consumer identifies 755 an acceptable work art compilation, the consumer may select the Add To Cart button 760. This action may automatically save the design into the consumer's online shopping cart. To see another rendition of the work art compilation, the consumer may select the View Your Personalization 755 button again to automatically create another version for review. Once the consumer is satisfied with the design, the consumer may select the Add To Cart button 760 to initiate an online purchase trusted transaction.

Figure 9:
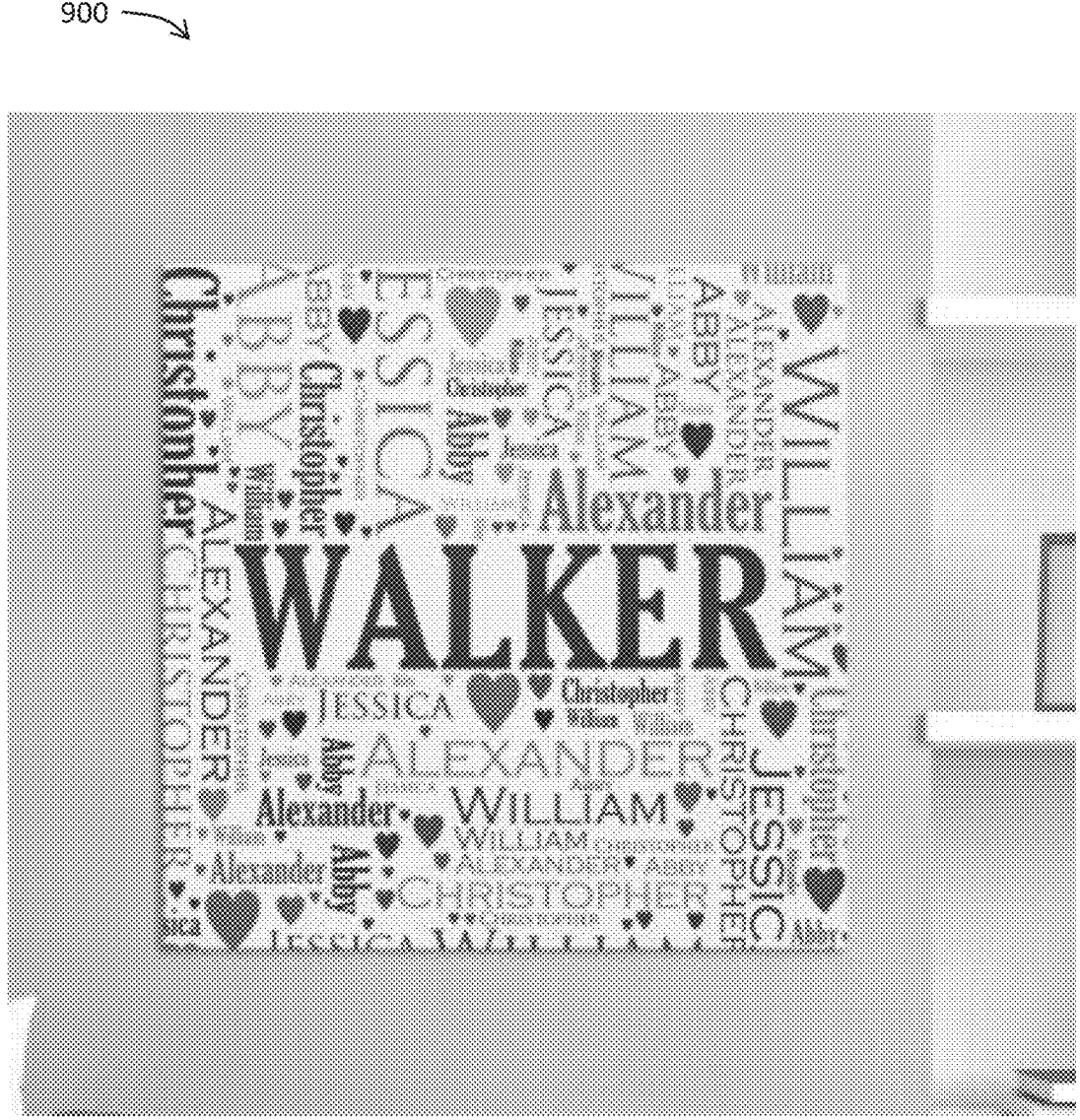
FIGS. 9-14 are schematic representations of exemplary personalized artwork as created by a computer program product according to an embodiment of the present invention.

Referring now to FIG. 9, for example and without limitation, after a consumer may supply personalization data, the randomization Engine 105 may generate a randomized design 900 that includes a word-cloud of that consumer's input values as incorporated into a wall-hanging made of wrapped canvas. The entered name (as illustrated, 'Walker') may be surrounded by repeating and visually-random placed text that may appear in a variety of fonts, sizes, and colors, and also either horizontal or vertical orientation (or both), along with selected symbols.

Figure 10:
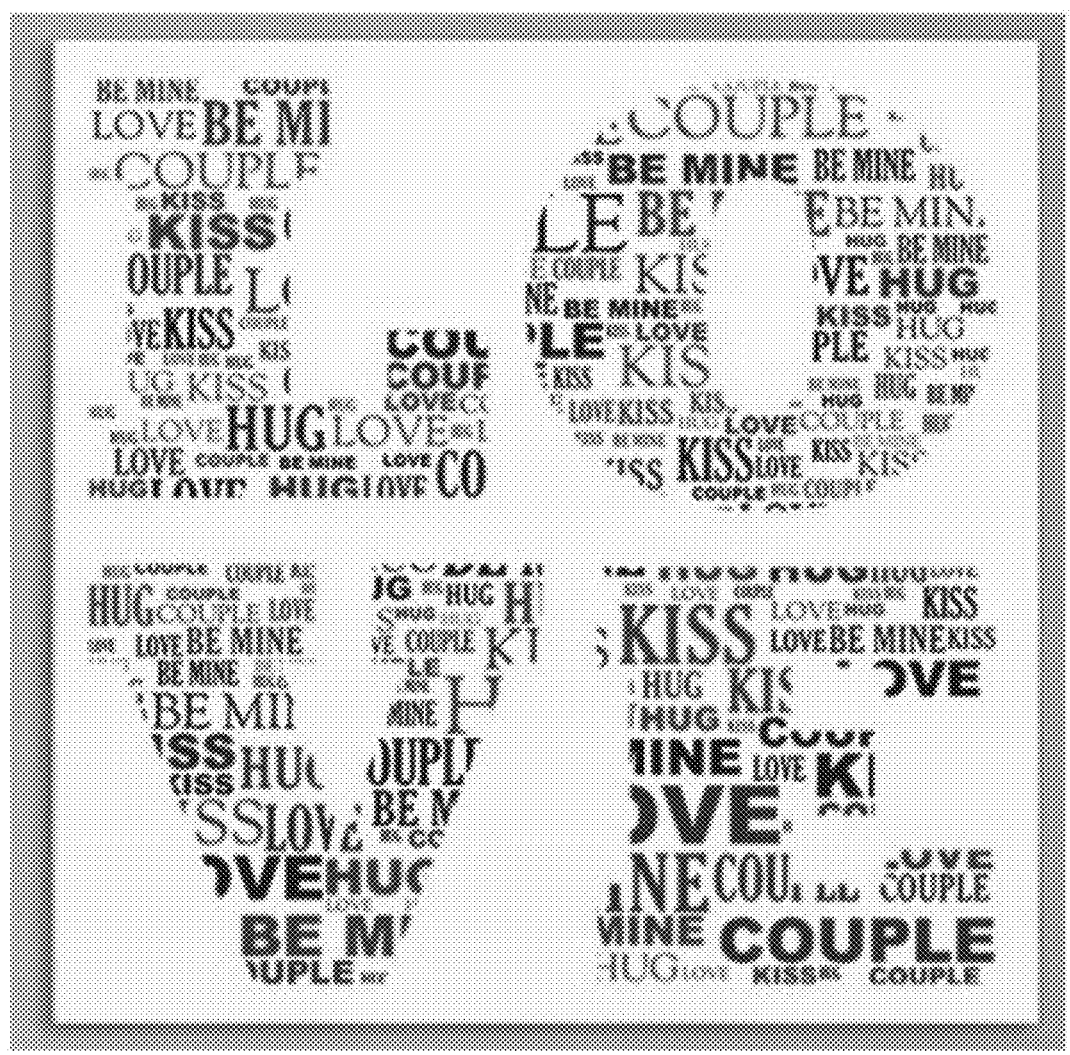

Referring now to FIG. 10, for example and without limitation, after a consumer may supply personalization data, the randomization Engine 105 may generate a randomized design 1000 that includes a word-cloud of that consumer's input values as incorporated into a medium having a regular surface (e.g., flat canvas of the selected size and thickness). The entered theme phrases (as illustrated, 'Couple,' 'Hug,' 'Kiss,' 'Love,' 'Be Mine') may be surrounded by repeating and visually-random placed text that may appear in a variety of fonts, sizes, and colors, and also either horizontal or vertical orientation (or both) depending on text direction setting. Subsequently, a pre-set outline shape of overlay type (featuring the artistic display of "LOVE" as illustrated), may be applied to mask all but the word art unobscured due to the overlay voids.

Figure 11:
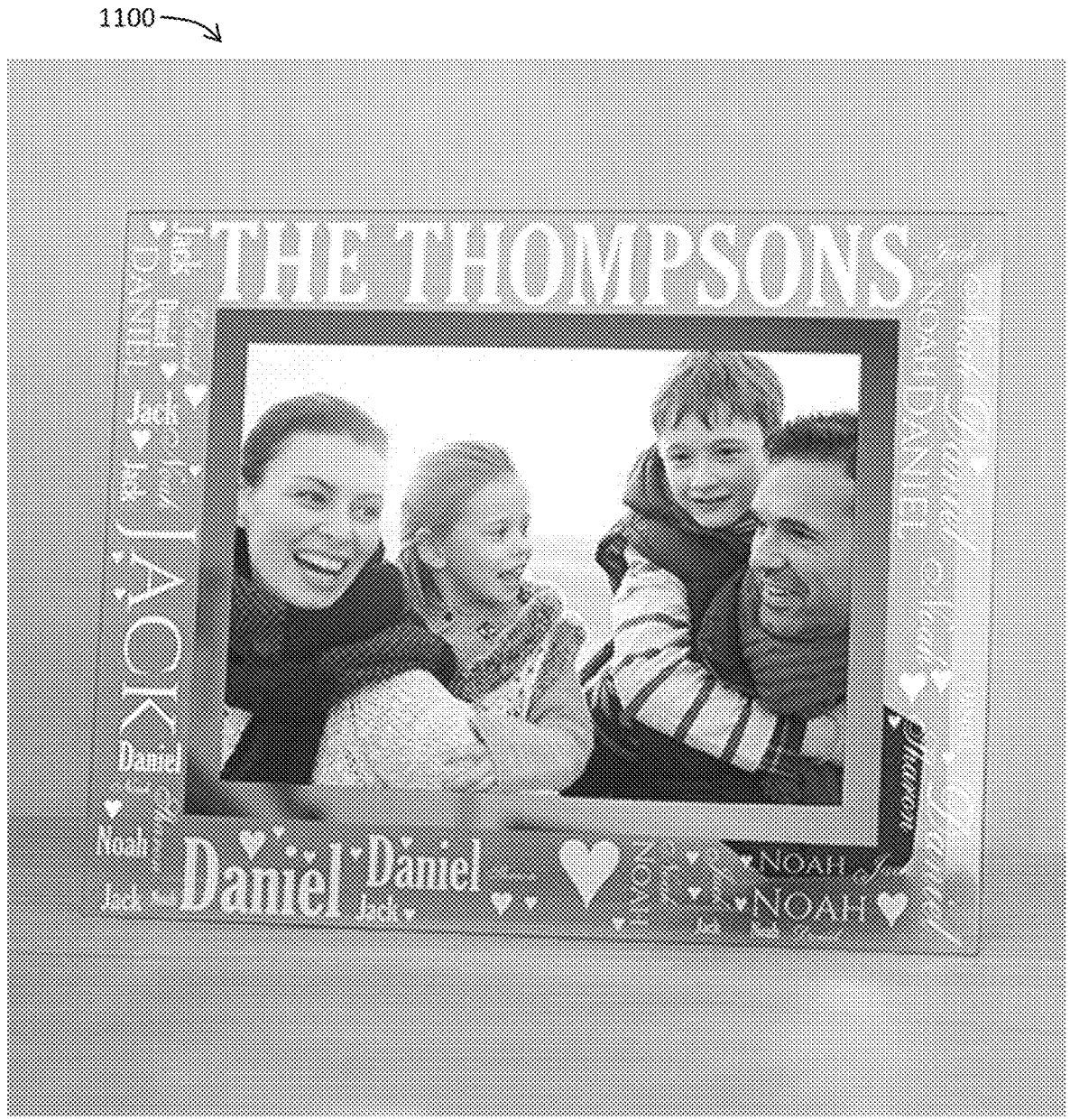

Referring now to FIG. 11, for example and without limitation, after a consumer may supply personalization data, the randomization Engine 105 may generate a randomized design that includes a word-cloud of that consumer's input values as incorporated into a home décor item (i.e., picture frame, with centered digital photograph). The entered name (as illustrated, 'The Thompsons') may be surrounded by repeating and visually-random placed text that may appear in a variety of fonts, sizes, and colors, and also either horizontal or vertical orientation (or both), along with selected symbols (e.g., hearts).

Figure 12:

Referring now to FIG. 12, for example and without limitation, after a consumer may supply personalization data, the randomization Engine 105 may generate a randomized design that includes a word-cloud of that consumer's input values as incorporated into kitchenware item (i.e., cutting board). The entered name (as illustrated, 'Mom') may be surrounded by repeating and visually-random placed text that may appear in a variety of fonts, sizes, and colors, and also either horizontal or vertical orientation (or both), along with selected symbols (e.g., hearts).

Figure 13:

Referring now to FIG. 13, for example and without limitation, after a consumer may supply personalization data, the randomization Engine 105 may generate a randomized design that includes a word-cloud of that consumer's input values as incorporated into kitchenware item (i.e., coffee cup). The entered name (as illustrated, 'Becker') may be surrounded by repeating and visually-random placed text that may appear in a variety of fonts, sizes, and colors, and also either horizontal or vertical orientation (or both), along with selected symbols (e.g., hearts), and emblazoned on an irregular (curved) surface.

Figure 14:
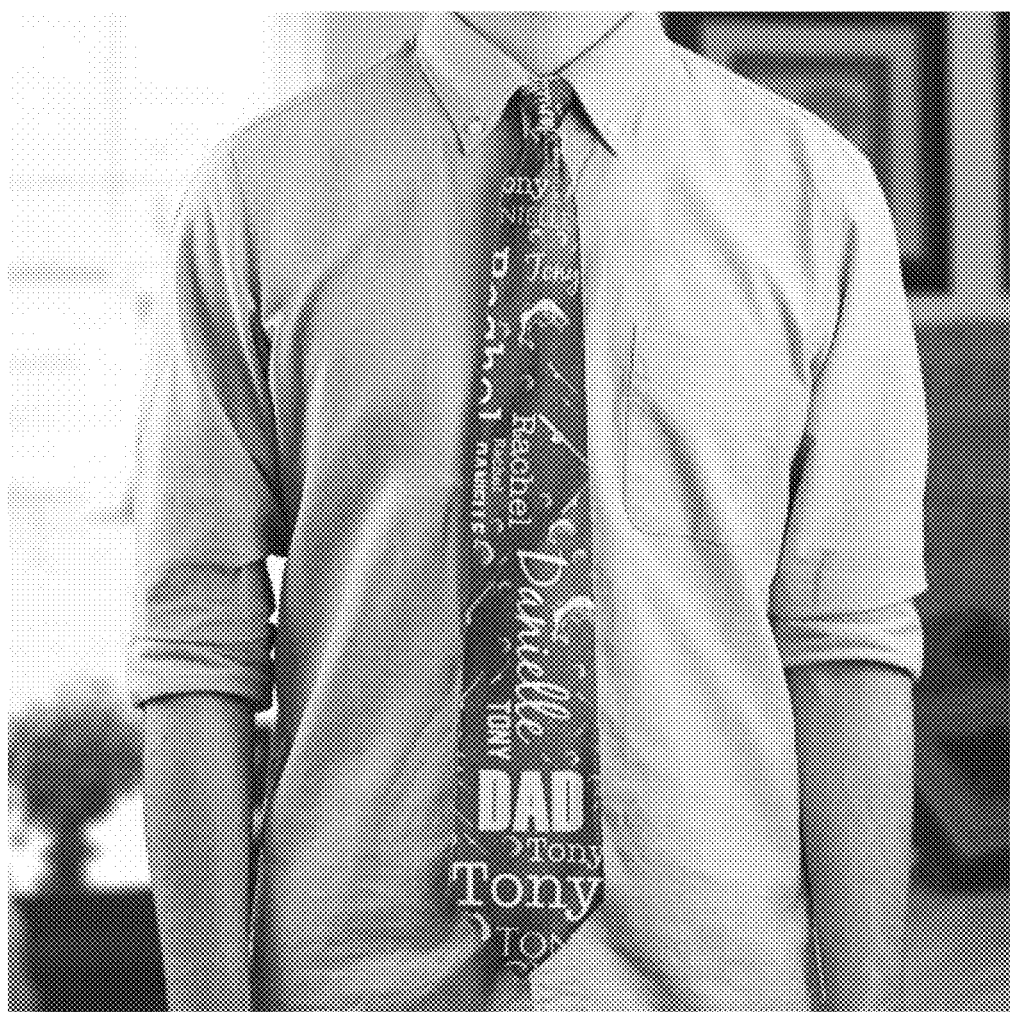

Referring now to FIG. 14, for example and without limitation, after a consumer may supply personalization data, the randomization Engine 105 may generate a randomized design that includes a word-cloud of that consumer's input values as incorporated into an apparel item (i.e., necktie). The entered name (as illustrated, 'Dad') may be surrounded by repeating and visually-random placed text that may appear in a variety of fonts, sizes, and colors, and also either horizontal or vertical orientation (or both), along with selected symbols, and bounded by an outline shape generally coextensive with the necktie itself.

In yet another embodiment (not shown, but similar to the interfaces and personalized art results described above), a 'Couples Names' word art design may be created and ordered as follows:

Step 1: Enter the couples names into the Couples Names box. The couple's names will appear in the center of the design. Example: 'Emma & Joshua'

Step 2: Enter word art text: This is the text the consumer may like to appear layered and randomized around the couple's names. An initial list may be provided by the system 100 to help start the process. However, the consumer may add, change and remove the supplied text. The system 100 may prompt the consumer to include important dates and places or words with special meaning, in keeping with the theme. The system 100 may also enforce art object 140 constraints (e.g., each name or phrase on their individual line; limit of 20 character/spaces per name; limit of 20 lines of names). Example:

Forever
Oct. 15, 2015
True Love

Step 3: Select the View Your Personalization button to automatically generate word art design.

Step 4: Display Word-Art design. Consumer may select Preview again to see another version and/or to adjust the words within the word art to make the necessary corrections and repeat Steps 3 and 4.

Step 5: Select the Accept the personalization check box and Add to Cart.

Figure 16:
FIGS. 16-20 are schematic representations of exemplary personalized artwork as created by a computer program product according to an embodiment of the present invention.

For any and all of the embodiments mentioned herein a user may have the option to select for any of the user's chosen word art to either be in a horizontal, vertical, or slanted orientation, or any combination thereof. For example, without limitation, as illustrated in FIG. 16, for the randomized design 1600 a user may input a number of names of people such as "Lauren", "Ashton", "Olivia", and "Thompson" and select the slanted word art option for the randomized word art outputted by the system to run the words at an angle. Continuing to reference FIG. 16, the user may also without limitation choose design objects, such as hearts, to run along with the randomized word art at the same slanted, horizontal, or vertical angle.

Figure 17:
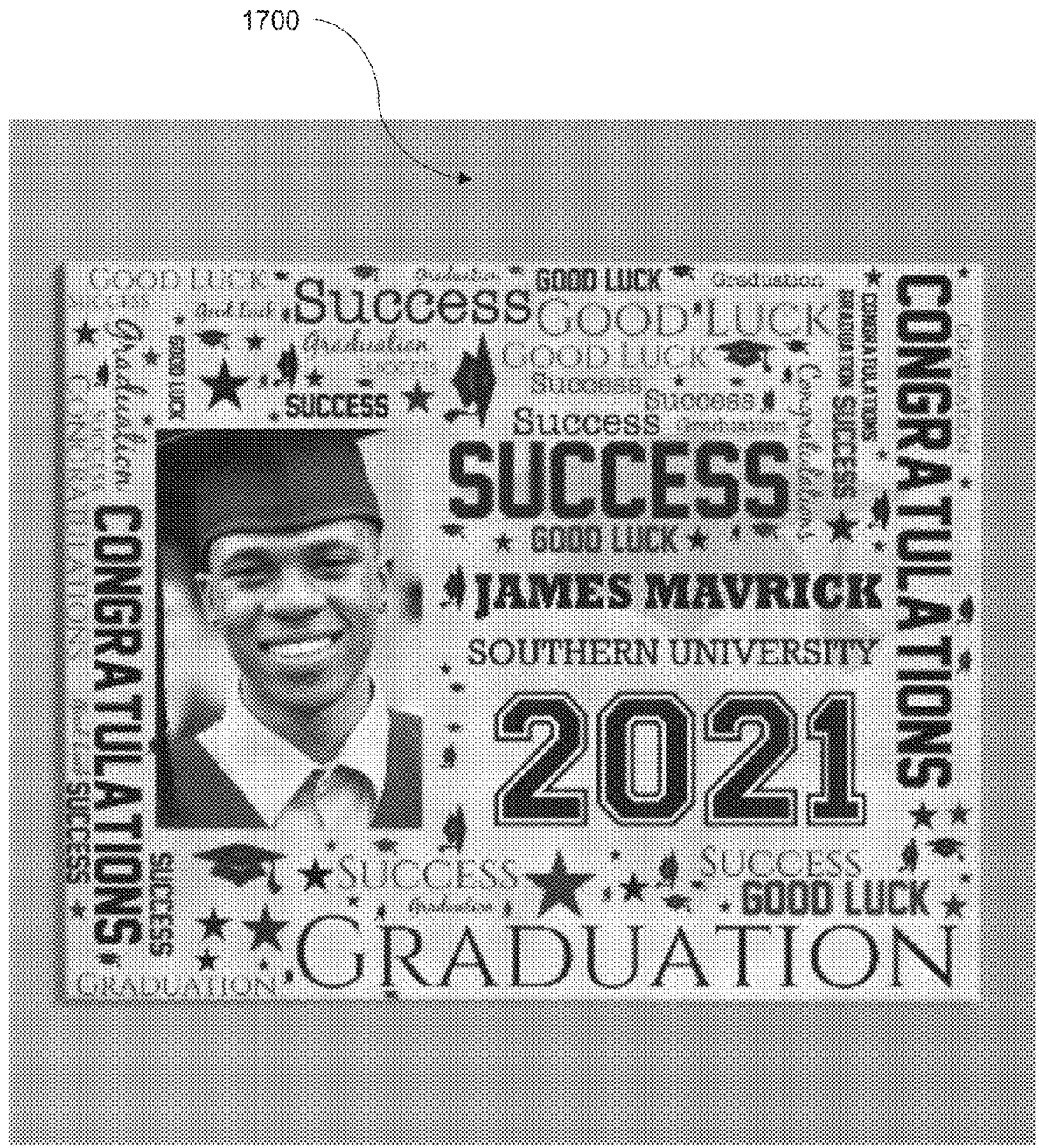

Now referencing FIG. 17, the feature of the present invention that may allow a user to select multiple different word arts to be displayed in the same design is described in more detail. For the randomized design 1700 a user may be given the option to select different placement types of multiple word art options. For example, a user may choose a large title (i.e. "2021") along with two smaller title word art (i.e. "James Maverick" and "Southern University") and a figure or photo to be placed in either a random or predetermined placement on the design. The user may also input a plurality of text the system use may to create a randomized word art surrounding the large titles, smaller titles, and figures. An embodiment of the present invention may also offer suggestions to the consumer client of at least one of an alternate art object, an alternate photo, and an alternate word to be included to create the personalized artwork based on the selected at least one art object, the selected photo object, and the selected at least one word.

Figure 18:
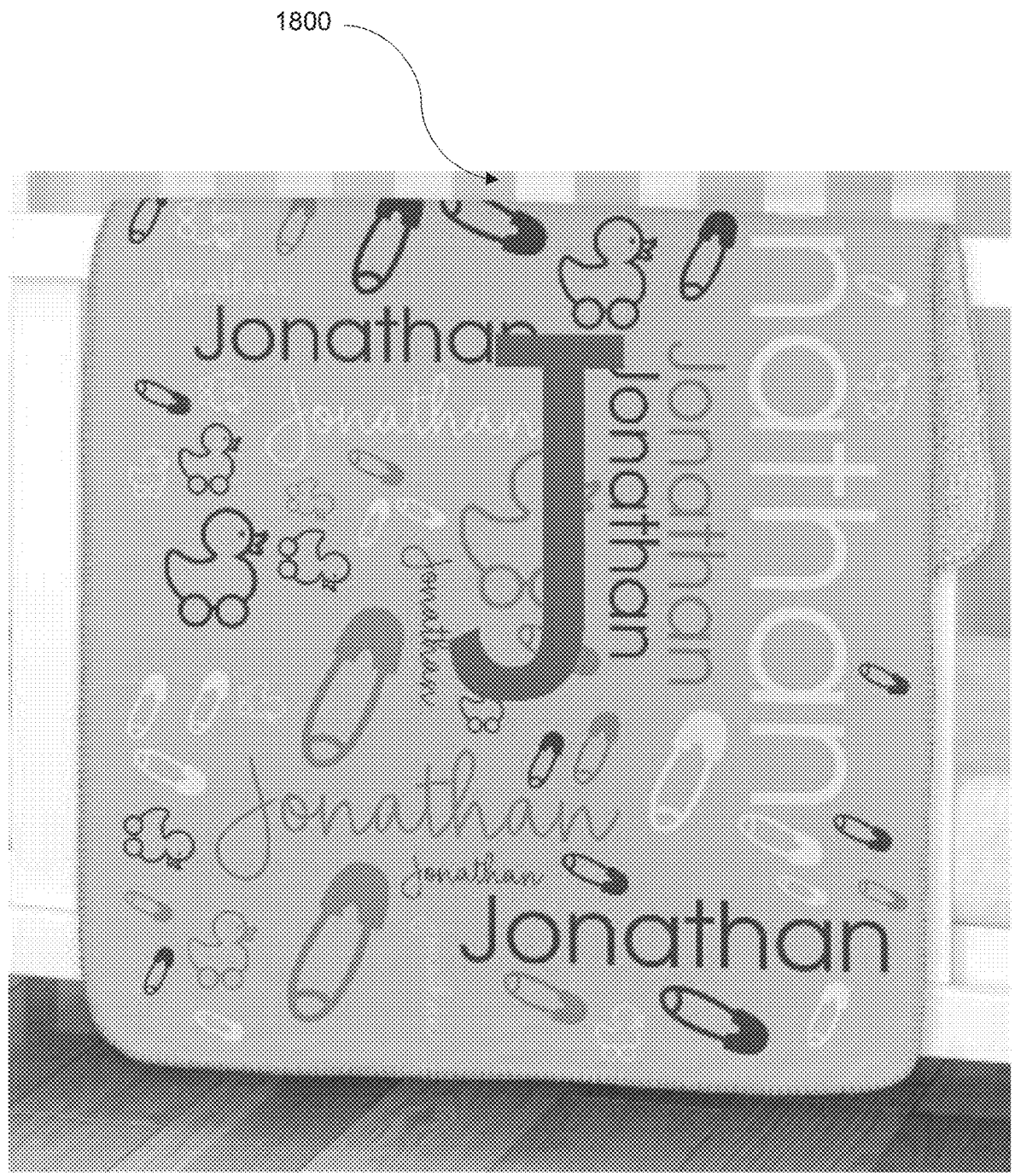
Figure 19:
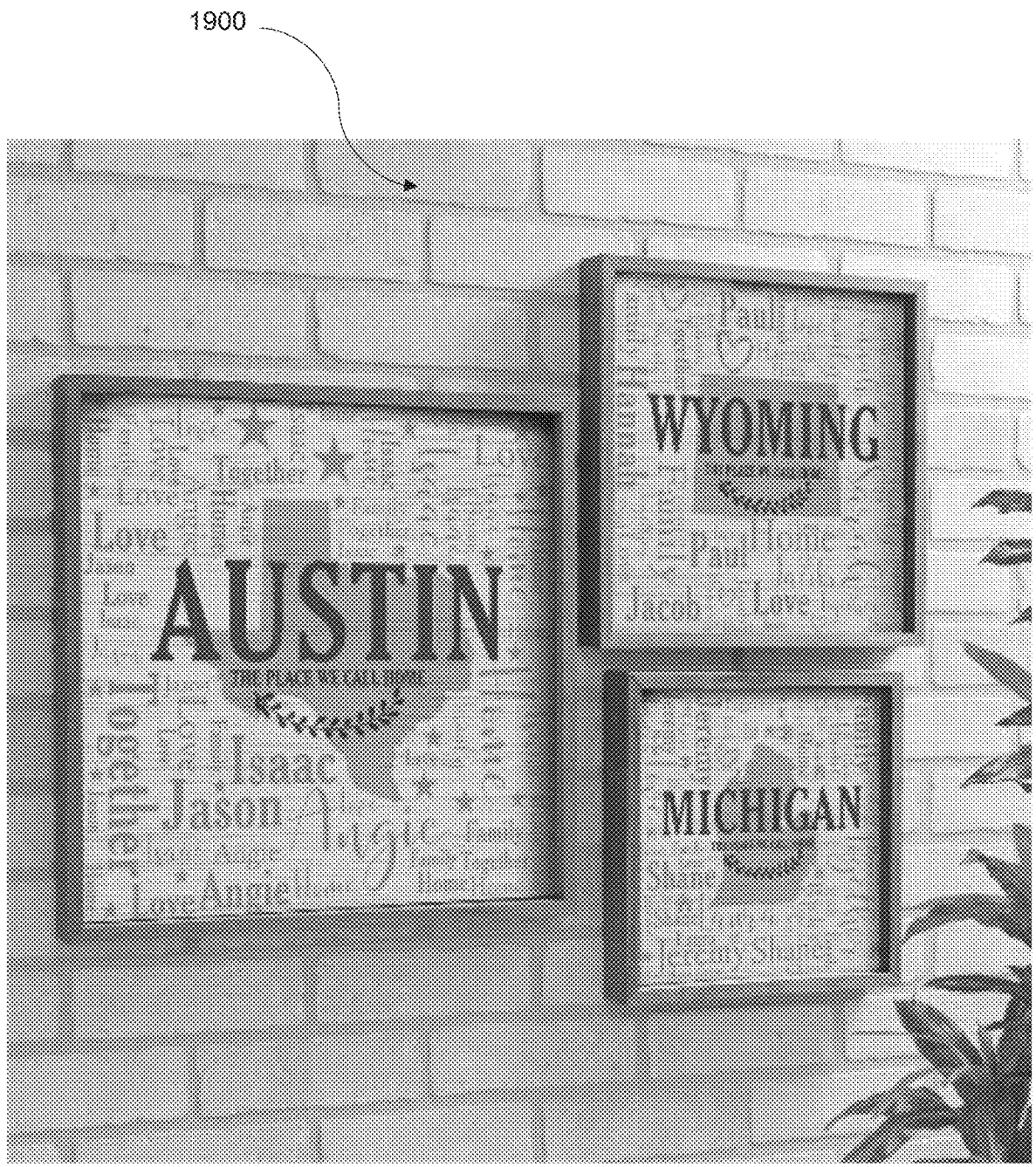

A user may also have the option to select whether any of their designs or word art may be cut-off or superimposed upon each other according to the user's selection. For example, as illustratively shown in FIG. 18, a user may choose a plurality of words and figures to be randomized as word art and may also input a plurality of other types of objects to be placed in the foreground of the design and superimposed over top other word art within the randomized design 1800 design. Continuing to reference FIG. 18, a user may input a name (i.e. "Jonathan") and figures, such as safety pins and ducks, to be used as a randomized word art background. The user may also select a letter (i.e. "J") to be used as the foreground object to be superimposed over top the other word art designs. Furthermore, as illustratively shown in FIG. 19 for the randomized design 1900 a user may select a background figure (i.e. a drawing of a geographic area) and input words to be used as a title and slogan to be superimposed over the selected figure and may enter in other text and figures to be used as randomized word art surrounding the background figure and the title.

An embodiment of the present invention may also give a consumer client the option to select a art object or word to be a boldness greater than the boldness of other art objects and/or words in the personalized artwork. For example, a consumer client may select a "J" in his or her personalized artwork to be a boldness greater than the boldness of other art objects or words in the personalized artwork, as illustratively shown in FIG. 18. Also, an embodiment of the present invention may allow a consumer client the option to select an art object or word in the personalized artwork to be highlighted.

Figure 20:

Now referencing FIG. 20, for randomized design 2000 a user may have the option to select a layout design so that their word art may follow the layout of the selected design or the word art may create the shape of the selected design out of the randomized word art. For example, as illustratively shown in FIG. 20, a user may be able to choose a layout (i.e. a baseball) where the user's word art may be used to follow the shape, angles, and lines of the layout with or without superimposition of any of the design elements to create the shape of the layout with the randomized word art. The user may also be able to choose a title or foreground text to be placed in the center or other chosen placement on the design or layout.

Referring now more specifically to FIG. 10, an embodiment of the invention may provide a randomized design 1000 that may include a plurality of words selected by the user to be fit within a pattern also selected by the user. The randomized design 1000 of this embodiment of the invention includes the option to allow the user to have their designs and/or word art cut off to fit within the pattern. In the example illustrated in FIG. 10, the randomized design 1000 is the word "LOVE" with the letters being filled with the plurality of words selected by the user, but that the plurality of words selected by the user are cut off at the boarders of the letters of the word "LOVE." Those skilled in the art will appreciate that the randomized design 1000 may take on any other shape that may be available for the user to select and/or upload to be used with the randomization engine of the present invention to provide a unique design with the plurality of words cut off to fit within the design.

Figure 15:
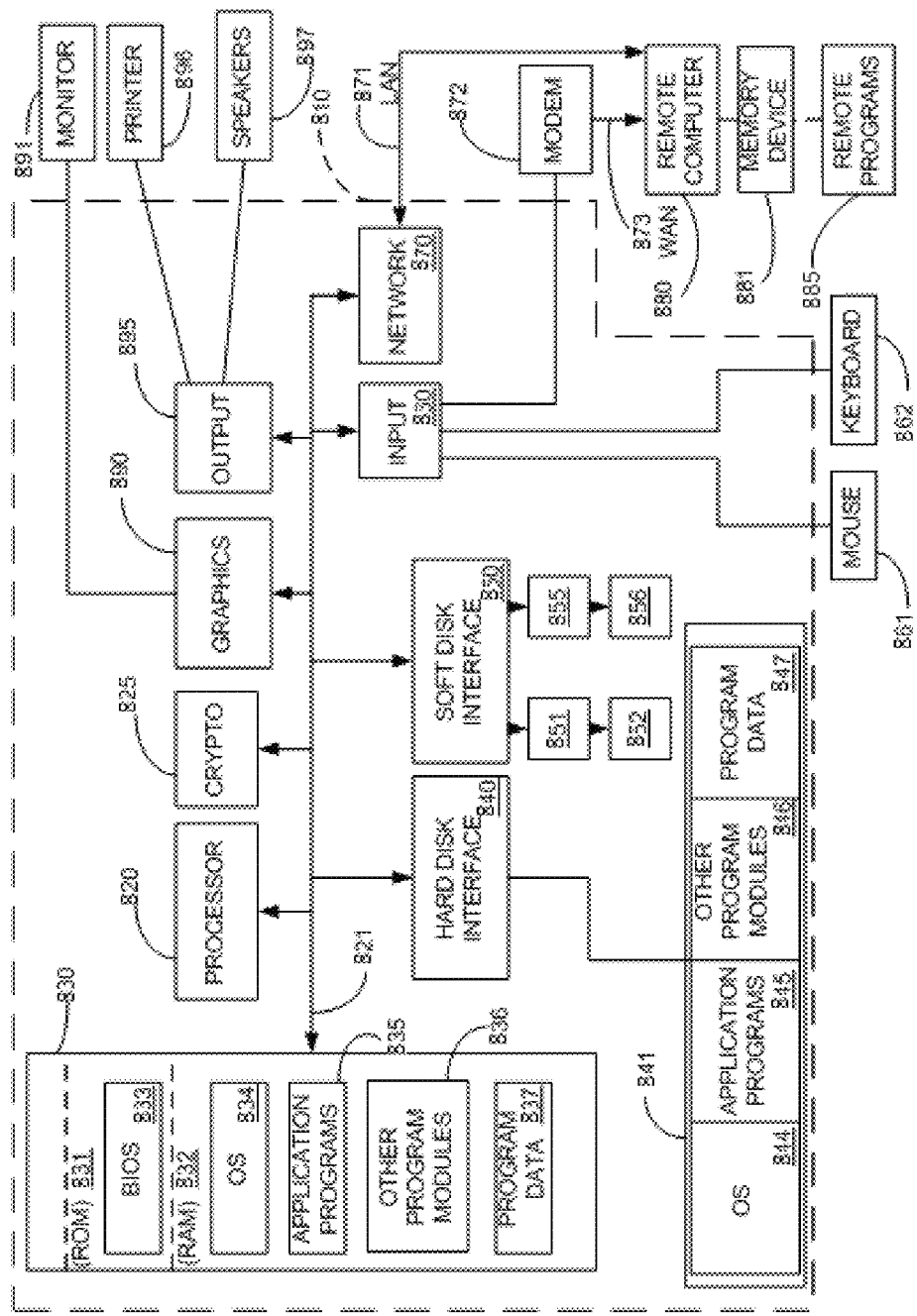
FIG. 15 is a block diagram representation of a machine in the example form of a computer system according to an embodiment of the present invention.

A skilled artisan will note that one or more of the aspects of the present invention may be performed on a computing device. The skilled artisan will also note that a computing device may be understood to be any device having a processor, memory unit, input, and output. This may include, but is not intended to be limited to, cellular phones, smart phones, kiosks, tablet computers, laptop computers, desktop computers, personal digital assistants, etc. FIG. 15 illustrates a model computing device in the form of a computer 810, which is capable of performing one or more computer-implemented steps in practicing the method aspects of the present invention. Components of the computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI).

The computer 810 may also include a cryptographic unit 825. Briefly, the cryptographic unit 825 has a calculation function that may be used to verify digital signatures, calculate hashes, digitally sign hash values, and encrypt or decrypt data. The cryptographic unit 825 may also have a protected memory for storing keys and other secret data. In other embodiments, the functions of the cryptographic unit may be instantiated in software and run via the operating system.

A computer 810 typically includes a variety of computer readable media. Computer readable media can be any available media that can be accessed by a computer 810 and includes both volatile and nonvolatile media, removable and non-removable media. By way of example, and not limitation, computer readable media may include computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 15 illustrates an operating system (OS) 834, application programs 835, other program modules 836, and program data 837.

The computer 810 may also include other removable/non-removable, volatile/nonvolatile computer storage media. By way of example only, FIG. 15 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives, and their associated computer storage media discussed above and illustrated in FIG. 15, provide storage of computer readable instructions, data structures, program modules and other data for the computer 810. In FIG. 15, for example, hard disk drive 841 is illustrated as storing an OS 844, application programs 845, other program modules 846, and program data 847. Note that these components can either be the same as or different from OS 833, application programs 833, other program modules 836, and program data 837. The OS 844, application programs 845, other program modules 846, and program data 847 are given different numbers here to illustrate that, at a minimum, they may be different copies. A user may enter commands and information into the computer 810 through input devices such as a keyboard 862 and cursor control device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a graphics controller 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 15. The logical connections depicted in FIG. 15 include a local area network (LAN) 871 and a wide area network (WAN) 873 but may also include other networks 140. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 15 illustrates remote application programs 885 as residing on memory device 881.

The communications connections 870 and 872 allow the device to communicate with other devices. The communications connections 870 and 872 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Many modifications and other embodiments of the invention will come to the mind of one skilled in the art having the benefit of the teachings presented in the foregoing descriptions and the associated drawings. Thus the scope of the invention should be determined by the appended claims and their legal equivalents, and not by the examples given.

That which is claimed is:

1. A computer-implemented system to create personalized artwork the system comprising:
    an art creation server comprising a processor, a data store, and a controller comprising a plurality of subsystems including a data management engine, a randomization engine, and an online shopping engine;
    wherein each of the plurality of subsystems is configured to manipulate data included in the data store;
    wherein the art creation server is configured to be in data communication with a consumer client via a network;
    wherein online shopping engine is configured to be operated by the consumer client;
    wherein the data management engine is configured to receive at least one art object and at least one word;
    wherein the randomization engine is configured to automatically generate personalized artwork by selectively arranging a subset of the at least one art object and at least one word, defined as a selected at least one art object and a selected at least one word;
    wherein the selected at least one art object comprises a photo object defined as a selected photo object;
    wherein the randomization engine is configured to randomize the selected at least one art object, the selected photo object, and the selected at least one word to create the personalized artwork;
    wherein the randomization engine is configured to offer suggestions to the consumer client of at least one of an alternate art object, an alternate photo, and an alternate word to be included to create the personalized artwork based on the selected at least one art object, the selected photo object, and the selected at least one word;
    wherein the randomization engine is configured to automatically generate a rendering of the personalized artwork and display the rendering on a display screen;
    wherein the randomization engine is configured to selectively save the rendering of the personalized artwork based upon a save selection by a user;
    wherein the randomization engine is configured to selectively generate a different rendering of the personalized artwork based upon an edit selection by the user;
    wherein the online shopping engine is configured to process a purchase order for a good including the personalized artwork; and
    wherein the data store is configured to store the selected at least one art object, the at least one word, the personalized artwork, and the purchase order.

2. The computer implemented method according to claim 1 wherein selective information from the data store is configured to be output to a production device for making the good to include the rendering of the personalized artwork.

3. The computer-implemented system according to claim 1 wherein the data management engine is further configured to retrieve from the at least one art object and the at least one word a pre-set outline shape, a pre-set design element, and a pre-set medium setting.

4. The computer-implemented system according to claim 3 further comprising an art object server configured to be in data communication with the art creation server; wherein the data management engine is further configured to retrieve at least one of the pre-set outline shape, the pre-set design element, and the pre-set medium setting from the art object server.

5. The computer-implemented system according to claim 1 wherein the data management engine is configured to be operated by the consumer client to include in the selected at least one art object at least one of a custom outline shape, a custom design element, and a custom medium setting.

6. The computer-implemented system according to claim 5 wherein the data management engine is further configured to be operated by the consumer client to include in the selected at least one art object at least one design element including at least one of user-specified text as the selected at least one word and user-specified images, defined as dynamic input.

7. The computer-implemented system according to claim 1 wherein the selected at least one art object further includes at least one of a medium setting, an outline shape, and a design element.

8. The computer-implemented system according to claim 1 wherein selectively arranging the at least one art object and the at least one word includes selectively arranging the at least one art object and the at least one word in at least one of a horizontal configuration, a vertical configuration, and a slanted configuration.

9. The computer-implemented system according to claim 1 wherein selectively arranging the at least one art object and the at least one word includes selectively arranging the at least one art object and the at least one word in a configuration wherein at least one of the word and the art object can be superimposed on another of the at least one of the word and the art object.

10. The computer-implemented system according to claim 1 wherein selectively arranging the at least one art object and the at least one word includes selecting at least one art object to be highlighted in the personalized artwork and at least one word to be highlighted in the personalized artwork; wherein at least one word is selected to have a boldness that is greater than a boldness of other words on the personalized artwork; and wherein the at least at least one word that is selected to have a greater boldness is selected to be superimposed on the at least one art object that is selected to be highlighted.

11. The computer-implemented system according to claim 1 wherein selectively arranging the at least one art object and the at least one word includes selectively arranging the at least one art object and the at least one word within a pre-selected shape.

12. A computer-implemented method to create personalized artwork, including word clouds, for making personalized goods, including the use of an art creation server comprising a processor, a data store, and a controller comprising a plurality of subsystems including a data management engine, a randomization engine, and an online shopping engine with each of the plurality of subsystems being configured to manipulate data included in the data store, the method comprising:
receiving at least one art word and at least one art object that comprises a photo object defined as a selected photo object;
automatically generating the personalized artwork by selectively arranging a subset of the at least one art object and at least one word, defined as selected at least one art object and selected at least one word;
randomizing the selected at least one art object, the selected photo object, and the selected at least one word to create the personalized artwork;
suggesting at least one alternate art object, an alternate photo, and an alternate word to be included to create the personalized artwork based on the selected at least one art object, the selected photo object, and the selected at least one word;
automatically generating a rendering of the personalized artwork and displaying the rendering on a display screen;
selectively saving the rendering of the personalized artwork based upon a save selection by a user;
selectively generating a different rendering of the personalized artwork based upon an edit selection by the user;
processing a purchase order for a good including the personalized artwork; and
storing the selected at least one art object, the at least one art object, the at least one word, the personalized artwork, and the purchase order.

13. The method according to claim 12 further comprising outputting the personalized purchase information to a production device for making the good to include the rendering of the personalized artwork.

14. The method according to claim 12 further comprising retrieving from the at least one art object and the at least one word a pre-set outline shape, a pre-set design element, and a pre-set medium setting.

15. The method according to claim 14 wherein the data management engine is operable by a consumer client; and further comprising including in the selected at least one art object at least one of a custom outline shape, a custom design element, and a custom medium setting.

16. The method according to claim 15 further comprising including in the selected at least one art object at least one design element; and wherein the at least one design element includes at least one of user-specified text as the selected at least one word and user-specified images, defined as dynamic input.

17. The method according to claim 12 wherein the step of selectively arranging further comprises selectively arranging the at least one art object and the at least one word by selecting one of the at least one art object and the at least one word to be highlighted in the personalized artwork.

18. The method according to claim 17 further comprising selecting at least one word to have a boldness greater than a boldness of other words on the personalized artwork; and further comprising superimposing the at least one word selected to have a greater boldness on the at least one art object that is selected to be highlighted.

19. The method according to claim 12 wherein the step of selectively arranging further comprises selectively arranging the at least one art object and at least one word within a pre-selected shape.

20. The method according to claim 12 wherein the step of selectively arranging the at least one art object and the at least one word further comprises selectively arranging the at least one art object and the at least one word in at least one of a horizontal configuration, a vertical configuration, and a slanted configuration.

21. The method according to claim 12 wherein selectively arranging the at least one art object and the at least one word further comprises selectively arranging the at least one art object and the at least one word in a configuration wherein at least one of the word and the art object can be superimposed on another of the at least one of the word and the art object.

\* \* \* \* \*